US012524053B2

(12) United States Patent
Goergen et al.

(10) Patent No.: US 12,524,053 B2
(45) Date of Patent: *Jan. 13, 2026

(54) DELIVERY OF AC POWER WITH HIGHER POWER PoE (POWER OVER ETHERNET) SYSTEMS

(71) Applicant: Cisco Technology, Inc., San Jose, CA (US)

(72) Inventors: Joel Richard Goergen, Soulsbyville, CA (US); Chad M. Jones, Doylestown, OH (US); Dylan T. Walker, Austin, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 18/457,838

(22) Filed: Aug. 29, 2023

(65) Prior Publication Data

US 2023/0400902 A1 Dec. 14, 2023

Related U.S. Application Data

(63) Continuation of application No. 17/705,797, filed on Mar. 28, 2022, now Pat. No. 11,782,491, which is a continuation of application No. 16/913,632, filed on Jun. 26, 2020, now Pat. No. 11,327,541, which is a
(Continued)

(51) Int. Cl.
G06F 1/00 (2006.01)
G06F 1/26 (2006.01)
H04L 12/10 (2006.01)
H04L 12/40 (2006.01)

(52) U.S. Cl.
CPC .............. *G06F 1/266* (2013.01); *H04L 12/10* (2013.01); *H04L 12/40032* (2013.01); *H04L 12/40045* (2013.01)

(58) Field of Classification Search
CPC .... G06F 1/266; H04L 12/10; H04L 12/40032
See application file for complete search history.

(56) References Cited

U.S. PATENT DOCUMENTS

| 3,335,324 | A | 8/1967 | Buckeridge |
| 4,811,187 | A | 3/1989 | Nakajima et al. |
| 5,652,893 | A | 7/1997 | Ben-Meir et al. |

(Continued)

FOREIGN PATENT DOCUMENTS

| CN | 205544597 U | 8/2016 |
| CN | 104081237 B | 10/2016 |

(Continued)

OTHER PUBLICATIONS

Adapa R., et al., "Dynamic Thermal Rating of Substation Terminal Equipment," Cigre, 2004, 8 Pages.
(Continued)

*Primary Examiner* — Mohammed H Rehman

(57) ABSTRACT

A method is provided that includes grouping a plurality of ports at power sourcing equipment receiving pulse power and transmitting power from the group of ports at the power sourcing equipment to a power interface module operable to combine the power and provide an AC (alternating current) outlet configured to provide AC power to one or more devices.

20 Claims, 10 Drawing Sheets

Related U.S. Application Data continuation of application No. 16/040,745, filed on Jul. 20, 2018, now Pat. No. 10,732,688.

(60) Provisional application No. 62/641,203, filed on Mar. 9, 2018.

(56) References Cited

U.S. PATENT DOCUMENTS

| | | | |
|---|---|---|---|
| 6,008,631 A | 12/1999 | Johari | |
| 6,220,955 B1 | 4/2001 | Posa | |
| 6,259,745 B1 | 7/2001 | Chan | |
| 6,636,538 B1 | 10/2003 | Stephens | |
| 6,685,364 B1 | 2/2004 | Brezina et al. | |
| 6,826,368 B1 | 11/2004 | Koren et al. | |
| 6,855,881 B2 | 2/2005 | Khoshnood | |
| 6,860,004 B2 | 3/2005 | Hirano et al. | |
| 7,325,150 B2 | 1/2008 | Lehr et al. | |
| 7,420,355 B2 | 9/2008 | Liu et al. | |
| 7,490,996 B2 | 2/2009 | Sommer | |
| 7,492,059 B2 | 2/2009 | Peker et al. | |
| 7,509,505 B2 | 3/2009 | Randall et al. | |
| 7,566,987 B2 | 7/2009 | Black et al. | |
| 7,583,703 B2 | 9/2009 | Bowser et al. | |
| 7,589,435 B2 | 9/2009 | Metsker et al. | |
| 7,593,747 B1 | 9/2009 | Karam et al. | |
| 7,603,570 B2 | 10/2009 | Schindler et al. | |
| 7,616,465 B1 | 11/2009 | Vinciarelli | |
| 7,813,646 B2 | 10/2010 | Furey | |
| 7,835,389 B2 | 11/2010 | Yu et al. | |
| 7,854,634 B2 | 12/2010 | Filipon et al. | |
| 7,881,072 B2 | 2/2011 | Dibene, II et al. | |
| 7,915,761 B1 | 3/2011 | Jones et al. | |
| 7,921,307 B2 | 4/2011 | Karam et al. | |
| 7,924,579 B2 | 4/2011 | Arduini | |
| 7,940,787 B2 | 5/2011 | Karam | |
| 7,973,538 B2 | 7/2011 | Karam | |
| 8,020,043 B2 | 9/2011 | Karam | |
| 8,037,324 B2 | 10/2011 | Hussain | |
| 8,068,937 B2 | 11/2011 | Eaves | |
| 8,081,589 B1 | 12/2011 | Gilbrech et al. | |
| 8,184,525 B2 | 5/2012 | Karam | |
| 8,276,397 B1 | 10/2012 | Carlson et al. | |
| 8,279,883 B2 | 10/2012 | Diab et al. | |
| 8,310,089 B2 | 11/2012 | Schindler et al. | |
| 8,319,627 B2 | 11/2012 | Chan et al. | |
| 8,350,538 B2 | 1/2013 | Cuk | |
| 8,358,893 B1 | 1/2013 | Sanderson et al. | |
| 8,386,820 B2 | 2/2013 | Diab | |
| 8,638,008 B2 | 1/2014 | Baldwin et al. | |
| 8,700,923 B2 | 4/2014 | Fung | |
| 8,712,324 B2 | 4/2014 | Corbridge et al. | |
| 8,750,710 B1 | 6/2014 | Hirt et al. | |
| 8,768,528 B2 | 7/2014 | Millar et al. | |
| 8,781,637 B2 | 7/2014 | Eaves | |
| 8,787,775 B2 | 7/2014 | Earnshaw | |
| 8,829,917 B1 | 9/2014 | Lo et al. | |
| 8,836,228 B2 | 9/2014 | Xu et al. | |
| 8,842,430 B2 | 9/2014 | Hellriegel et al. | |
| 8,849,471 B2 | 9/2014 | Daniel et al. | |
| 8,935,543 B2 | 1/2015 | Hunter, Jr. et al. | |
| 8,966,747 B2 | 3/2015 | Vinciarelli et al. | |
| 9,019,895 B2 | 4/2015 | Li et al. | |
| 9,024,473 B2 | 5/2015 | Huff et al. | |
| 9,184,795 B2 | 11/2015 | Eaves | |
| 9,189,036 B2 | 11/2015 | Ghoshal et al. | |
| 9,189,043 B2 | 11/2015 | Vorenkamp et al. | |
| 9,273,906 B2 | 3/2016 | Goth et al. | |
| 9,319,101 B2 | 4/2016 | Lontka | |
| 9,321,362 B2 | 4/2016 | Woo et al. | |
| 9,373,963 B2 | 6/2016 | Kuznetsov | |
| 9,419,436 B2 | 8/2016 | Eaves et al. | |
| 9,484,771 B2 | 11/2016 | Braylovskiy et al. | |
| 9,510,479 B2 | 11/2016 | Vos | |
| 9,531,551 B2 | 12/2016 | Balasubramanian et al. | |
| 9,590,811 B2 | 3/2017 | Hunter, Jr. et al. | |
| 9,618,714 B2 | 4/2017 | Murray | |
| 9,627,894 B1 | 4/2017 | Mayer et al. | |
| 9,640,998 B2 | 5/2017 | Dawson | |
| 9,665,148 B2* | 5/2017 | Hamdi | H04L 12/40045 |
| 9,693,244 B2 | 6/2017 | Maruhashi et al. | |
| 9,734,940 B1 | 8/2017 | McNutt et al. | |
| 9,853,689 B2 | 12/2017 | Eaves | |
| 9,874,930 B2 | 1/2018 | Vavilala et al. | |
| 9,882,656 B2 | 1/2018 | Sipes, Jr. et al. | |
| 9,893,521 B2 | 2/2018 | Lowe et al. | |
| 9,927,864 B2* | 3/2018 | Selvarajan | G06F 1/3218 |
| 9,948,198 B2 | 4/2018 | Imai | |
| 9,979,370 B2 | 5/2018 | Xu | |
| 9,985,600 B2 | 5/2018 | Xu et al. | |
| 10,007,628 B2 | 6/2018 | Pitigoi-Aron et al. | |
| 10,028,417 B2 | 7/2018 | Schmidtke et al. | |
| 10,060,965 B1 | 8/2018 | Skinner et al. | |
| 10,128,764 B1 | 11/2018 | Vinciarelli | |
| 10,248,178 B2 | 4/2019 | Brooks et al. | |
| 10,263,526 B2 | 4/2019 | Sandusky et al. | |
| 10,407,995 B2 | 9/2019 | Moeny | |
| 10,439,432 B2 | 10/2019 | Eckhardt et al. | |
| 10,468,879 B2 | 11/2019 | Eaves | |
| 10,541,543 B2 | 1/2020 | Eaves | |
| 10,714,930 B1 | 7/2020 | Weiss et al. | |
| 10,735,105 B2 | 8/2020 | Goergen et al. | |
| 11,327,541 B2 | 5/2022 | Goergen et al. | |
| 2001/0024373 A1 | 9/2001 | Cuk | |
| 2002/0126967 A1 | 9/2002 | Panak et al. | |
| 2003/0009705 A1* | 1/2003 | Thelander | G06F 1/3203 |
| | | | 713/340 |
| 2004/0000816 A1 | 1/2004 | Khoshnood | |
| 2004/0033076 A1 | 2/2004 | Song et al. | |
| 2004/0043651 A1 | 3/2004 | Bain et al. | |
| 2004/0073703 A1 | 4/2004 | Boucher et al. | |
| 2004/0230846 A1 | 11/2004 | Mancey et al. | |
| 2005/0197018 A1 | 9/2005 | Lord | |
| 2005/0268120 A1 | 12/2005 | Schindler et al. | |
| 2006/0202109 A1 | 9/2006 | Delcher et al. | |
| 2006/0209875 A1 | 9/2006 | Lum et al. | |
| 2007/0103168 A1 | 5/2007 | Batten et al. | |
| 2007/0144704 A1 | 6/2007 | Bundza et al. | |
| 2007/0236853 A1 | 10/2007 | Crawley | |
| 2007/0263675 A1 | 11/2007 | Lum et al. | |
| 2007/0284941 A1 | 12/2007 | Robbins | |
| 2007/0284946 A1 | 12/2007 | Robbins | |
| 2007/0288125 A1 | 12/2007 | Quaratiello | |
| 2007/0288771 A1 | 12/2007 | Robbins | |
| 2008/0055946 A1 | 3/2008 | Lesso et al. | |
| 2008/0150480 A1* | 6/2008 | Navid | A63F 13/90 |
| | | | 320/113 |
| 2008/0198635 A1 | 8/2008 | Hussain et al. | |
| 2008/0229120 A1 | 9/2008 | Diab | |
| 2008/0310067 A1 | 12/2008 | Diab et al. | |
| 2009/0055672 A1 | 2/2009 | Burkland et al. | |
| 2009/0138692 A1* | 5/2009 | Duda | H04L 49/30 |
| | | | 713/1 |
| 2009/0160259 A1 | 6/2009 | Naiknaware et al. | |
| 2010/0077239 A1 | 3/2010 | Diab et al. | |
| 2010/0117808 A1 | 5/2010 | Karam | |
| 2010/0171602 A1 | 7/2010 | Kabbara et al. | |
| 2010/0190384 A1 | 7/2010 | Lanni | |
| 2010/0237846 A1 | 9/2010 | Vetteth | |
| 2010/0290190 A1 | 11/2010 | Chester et al. | |
| 2011/0004773 A1 | 1/2011 | Hussain et al. | |
| 2011/0057612 A1 | 3/2011 | Taguchi et al. | |
| 2011/0083824 A1 | 4/2011 | Rogers | |
| 2011/0228578 A1 | 9/2011 | Serpa et al. | |
| 2011/0266867 A1 | 11/2011 | Schindler et al. | |
| 2011/0290497 A1 | 12/2011 | Stenevik | |
| 2012/0043935 A1 | 2/2012 | Dyer et al. | |
| 2012/0064745 A1 | 3/2012 | Ottliczky | |
| 2012/0170927 A1 | 7/2012 | Huang et al. | |
| 2012/0201089 A1 | 8/2012 | Barth et al. | |
| 2012/0231654 A1 | 9/2012 | Conrad | |
| 2012/0303758 A1* | 11/2012 | Anbarasan | H04L 41/0266 |
| | | | 709/218 |
| 2012/0317426 A1 | 12/2012 | Hunter, Jr. et al. | |
| 2012/0319468 A1 | 12/2012 | Schneider et al. | |

(56) References Cited

U.S. PATENT DOCUMENTS

| | | |
|---|---|---|
| 2013/0076133 A1 | 3/2013 | Gammel et al. |
| 2013/0077923 A1 | 3/2013 | Peeters Weem et al. |
| 2013/0079633 A1 | 3/2013 | Peeters Weem et al. |
| 2013/0103220 A1 | 4/2013 | Eaves |
| 2013/0127257 A1 | 5/2013 | Yamamoto et al. |
| 2013/0249292 A1 | 9/2013 | Blackwell, Jr. et al. |
| 2013/0272721 A1 | 10/2013 | Van Veen et al. |
| 2013/0329344 A1 | 12/2013 | Tucker et al. |
| 2014/0111180 A1 | 4/2014 | Vladan et al. |
| 2014/0126151 A1 | 5/2014 | Campbell et al. |
| 2014/0129850 A1 | 5/2014 | Paul |
| 2014/0258742 A1 | 9/2014 | Chien et al. |
| 2014/0265550 A1 | 9/2014 | Milligan et al. |
| 2014/0372773 A1 | 12/2014 | Heath et al. |
| 2015/0078740 A1 | 3/2015 | Sipes, Jr. et al. |
| 2015/0106539 A1 | 4/2015 | Leinonen et al. |
| 2015/0115741 A1 | 4/2015 | Dawson |
| 2015/0215001 A1 | 7/2015 | Eaves |
| 2015/0215131 A1 | 7/2015 | Paul et al. |
| 2015/0333918 A1 | 11/2015 | White, III |
| 2015/0340818 A1 | 11/2015 | Scherer et al. |
| 2015/0365003 A1 | 12/2015 | Sadwick |
| 2015/0378428 A1* | 12/2015 | Selvarajan ............ G06F 1/3218 713/340 |
| 2016/0018252 A1 | 1/2016 | Hanson et al. |
| 2016/0020911 A1 | 1/2016 | Sipes, Jr. et al. |
| 2016/0064938 A1 | 3/2016 | Balasubramanian et al. |
| 2016/0111877 A1 | 4/2016 | Eaves et al. |
| 2016/0118784 A1 | 4/2016 | Saxena et al. |
| 2016/0133355 A1 | 5/2016 | Glew et al. |
| 2016/0134331 A1 | 5/2016 | Eaves |
| 2016/0142217 A1 | 5/2016 | Gardner et al. |
| 2016/0188427 A1 | 6/2016 | Chandrashekar et al. |
| 2016/0197600 A1 | 7/2016 | Kuznetsov |
| 2016/0241148 A1 | 8/2016 | Kizilyalli et al. |
| 2016/0262288 A1 | 9/2016 | Chainer et al. |
| 2016/0273722 A1 | 9/2016 | Crenshaw |
| 2016/0294500 A1 | 10/2016 | Chawgo et al. |
| 2016/0294568 A1 | 10/2016 | Chawgo et al. |
| 2016/0308683 A1 | 10/2016 | Pischl et al. |
| 2016/0322692 A1 | 11/2016 | Duffield et al. |
| 2016/0352535 A1 | 12/2016 | Hiscock et al. |
| 2016/0365967 A1 | 12/2016 | Tu et al. |
| 2017/0041152 A1 | 2/2017 | Sheffield |
| 2017/0041153 A1 | 2/2017 | Picard et al. |
| 2017/0054296 A1 | 2/2017 | Daniel et al. |
| 2017/0110871 A1 | 4/2017 | Foster |
| 2017/0123466 A1 | 5/2017 | Carnevale |
| 2017/0146260 A1 | 5/2017 | Ribbich et al. |
| 2017/0155517 A1 | 6/2017 | Cao |
| 2017/0155518 A1 | 6/2017 | Yang |
| 2017/0164525 A1 | 6/2017 | Chapel et al. |
| 2017/0214236 A1 | 7/2017 | Eaves |
| 2017/0229886 A1 | 8/2017 | Eaves |
| 2017/0234738 A1 | 8/2017 | Ross et al. |
| 2017/0244318 A1 | 8/2017 | Giuliano |
| 2017/0248976 A1 | 8/2017 | Moller et al. |
| 2017/0294966 A1 | 10/2017 | Jia et al. |
| 2017/0325320 A1 | 11/2017 | Wendt et al. |
| 2017/0359459 A1 | 12/2017 | Howe et al. |
| 2018/0024964 A1 | 1/2018 | Mao et al. |
| 2018/0053313 A1 | 2/2018 | Smith |
| 2018/0054083 A1 | 2/2018 | Hick |
| 2018/0060269 A1 | 3/2018 | Kessler |
| 2018/0088648 A1 | 3/2018 | Otani |
| 2018/0098201 A1 | 4/2018 | Torello et al. |
| 2018/0102604 A1 | 4/2018 | Keith et al. |
| 2018/0123360 A1 | 5/2018 | Eaves |
| 2018/0159430 A1 | 6/2018 | Albert |
| 2018/0188712 A1 | 7/2018 | Mackay |
| 2018/0191513 A1 | 7/2018 | Hess et al. |
| 2018/0254624 A1 | 9/2018 | Son |
| 2018/0313886 A1 | 11/2018 | Mlyniec et al. |
| 2019/0267804 A1 | 8/2019 | Matan et al. |
| 2019/0280895 A1 | 9/2019 | Mather et al. |
| 2020/0119879 A1* | 4/2020 | Chen ..................... H04W 72/23 |
| 2020/0233472 A1 | 7/2020 | Jones et al. |
| 2020/0275025 A1* | 8/2020 | El Kolli .................... G06F 1/26 |
| 2020/0295955 A1 | 9/2020 | O'Brien et al. |
| 2022/0190587 A1 | 6/2022 | Eaves et al. |

FOREIGN PATENT DOCUMENTS

| | | |
|---|---|---|
| CN | 104412541 B | 5/2019 |
| EP | 1936861 A1 | 6/2008 |
| EP | 2120443 A1 | 11/2009 |
| EP | 2693688 A1 | 2/2014 |
| WO | 9316407 A1 | 8/1993 |
| WO | 2006127916 A2 | 11/2006 |
| WO | 2010053542 A2 | 5/2010 |
| WO | 2017054030 A1 | 4/2017 |
| WO | 2017167926 A1 | 10/2017 |
| WO | 2018017544 A1 | 1/2018 |
| WO | 2019023731 A1 | 2/2019 |

OTHER PUBLICATIONS

Alexander C.K., "Fundamentals of Electric Circuits," Indian Edition, McGraw Hill Education, Matlab Examples, 2013, 37 Pages.
Audio/video, Information and Communication Technology Equipment—Part 1: Safety requirements, International Standard, IEC 62368-1, Edition 2.0, Feb. 2014, 680 Pages, ISBN 978-2-8322-1405-3.
Berkeley Lab ETA, "Touch-Safe, High Voltage Digital Electricity Transmission Using Packet Energy Transfer," Vimeo, https://vimeo.com/172469008, Mar. 8, 2016, 8 pages.
Chen H., et al., "Real-Time Temperature Estimation for Power MOSEFETs Considering Thermal Aging Effects," IEEE Transactions on Device and Materials Reliability, Mar. 2014, vol. 14, No. 1, pp. 220-228.
"Digital Electricity Gen2 Detailed Installation Manual," Voltserver Digital Electricity, Rev B.1, Nov. 29, 2017, 68 Pages.
Durfee D.A., "Curriculum Vitae," 4 pages.
Eaves S.S., et al., "Network Remote Power Using Packet Energy Transfer," Sep. 2012, 5 Pages, URL: www.voltserver.com.
Eaves S.S., "Network Remote Powering Using Packet Energy Transfer," Proceedings of IEEE International Conference on Telecommunications Energy (INTELEC), Sep. 30, 2012-Oct. 4, 2012, Scottsdale, AZ, 4 Pages.
Edelstein S., "Updated 2016 Tesla Model S also Gets New 75-kWh Battery Option," Voltserver Exhibit 1018, May 5, 2016, 3 Pages, Archived on Jun. 19, 2016 by Internet Archive Wayback machine at https://web.archive.org/web/20160619001148/https://www.greencarreports.com/news/1103782_updated-2016-tesla-model-s-also-gets-new-75-kwh-battery-option.
"Electrical—Computer Conference Proceedings," Internet Archive WayBack Machine Search for Intelec 2012, Curran Associates, Inc., http://www.proceedings.com/electrical-computer-proceedings.html, 2012, 125 pages.
"E-Link Hybrid Connector—QPC Fiber Optic," QPC Engineered Fiber Optic Solutions, retrieved on Dec. 21, 2017, retrieved from URL: http://www.qpcfiber.com/product/connectors/e-link-hybrid-connector/, 4 pages.
Examination Report in Counterpart Indian Application No. 202047033880, Mailed Jun. 30, 2022, 5 pages.
Hall S.H., "High-Speed Digital System Design, A Handbook of Interconnect Theory and Design Practices," Voltserver Exhibit 1030, Sep. 2000, 55 Pages.
Information Technology Equipment—Safety—Part 1: General Requirements, International Standard, IEC 60950-1, Edition 2.2, May 2013, 648 pages, ISBN 978-2-8322-0820-5.
"International Telecommunications Energy Conference: [proceedings] (Full Record)," Library Catalog, https://catalog.oc.gov/vwebv/holdingsInfo?searchId=3810&recPointer=O&recCount=25&searchType=1&bibId=11348322, retrieved from the Internet Feb. 12, 2021, 4 pages.
"International Telecommunications Energy Conference: [proceedings] (Marc Tags)," Library Catalog, https://catalog.loc.gov/vwebv/

(56) References Cited

OTHER PUBLICATIONS staffView?searchId=3877&recPointer=O&recCount=25&searchType=1&bibId=11348322, retrieved from the Internet Feb. 12, 2021, 3 pages.

Juniper Networks: "Virtual Chassis Technology Best Practices," Implementation Guide, Jan. 2016, 29 pages, 8010018-009-EN, URL: https://wwwjuniper.net/us/en/local/pdf/implementation-guides/8010018-en.pdf.

Lathi B.P., et al., "Modern Digital and Analog Communication Systems," Fourth Edition, Jan. 2009, 15 pages.

LC Catalog-Browse, https://catalog.loc.gov/vwebv/searchBrowse, retrieved from the Internet Feb. 12, 2021, 1 page.

"Effects of Current on Human Beings and Livestok—Part 1: General Aspects," Technical Specification, Basic Safety Publication, IEC/TS 60479-1, Edition 4.0, Jul. 2005, 122 pages, ISBN 2-8318-8096-3.

"Low-voltage Switchgear and Controlgear—Part 1: General Rules," International Standard, Amendment 2, IEC 60947-1, Edition 5.0, Sep. 2014, 106 Pages, ISBN 978-2-8322-1798-6.

Lumentum: "Power Over Fiber," 2015, 8 Pages, Retrieved from URL: https://www.lumentum.com/sites/default/files/technical-library-items/poweroverfiber-tn-pv-ae_0.pdf.

Microsemi, "Understanding 802.3at PoE Plus Standard Increases Available Power," Jun. 2011, 7 pages.

"NFPA 70: National Electrical Code," Voltserver Exhibit 1019, National Fire Protection Association, 2017 Edition, 881 Pages.

"Part VII: A Summary of Commonly Used Marc 21 Fields," Marc, Understanding Marc, https://www.loc.gov/marc//Umb/um07to10.html, retrieved from Internet Feb. 13, 2021, 17 pages.

Petition for Post Grant Review of U.S. Pat. No. 10,735,105 [Public] with Exhibits, filed Feb. 16, 2021, PGR 2021-00055, 132 Pages.

Petition for Post Grant Review of U.S. Pat. No. 10,735,105 [Public] with Exhibits, filed Feb. 16, 2021, PGR 2021-00056, 116 Pages.

Pluribus Networks: "Pluribus VirtualWire Solution," Product Overview, PN-PO-VWS-05818, May 2018, 5 pages, URL: https://www.pluribusnetworks.com/assets/Pluribus-VirtualWire-PO-50918.pdf.

Sedra A.S., "Microelectronic Circuits," Oxford, Seventh Edition, Jan. 2015, Published on 2014, 38 Pages.

Stallings W., "Data and Computer Communications," Voltserver Exhibit 1028, Macmillan Publishing Company, Fourth Edition, Jan. 1994, 14 Pages.

Stran Technologies: "TFOCA GenX Hybrid 2×2 Fiber Optic—Copper Connector," Contact Strantech, retrieved on Dec. 21, 2017, Retrieved From URL: https://www.strantech.com/products/tfoca-genx-hybrid-2x2-fiber-optic-copper-connector/, 2 pages.

Tanenbaum A.S., "Computer Networks," Voltserver Exhibit 1027, Prentice Hall PTR, Third Edition, Mar. 1996, 12 Pages.

*Voltserver Inc.*, v. *Cisco Systems, Inc.*, "Patent Owner's Preliminary Response to Post Grant Review under 35 U.S.C. 312 and 37 C.F.R. 42.107," United States Patent and Trademark Office, PGR2021-00056, U.S. Pat. No. 10,735,105, 2021, Jun. 2, 2021, 46 pages.

*Voltserver Inc.*, v. *Cisco Systems, Inc.*, "Patent Owners Preliminary Response to Post Grant Review under 35 U.S.C. 312 and 37 C.F.R. 42.107," United States Patent and Trademark Office, PGR2021-00055, U.S. Pat. No. 10,735,105, 2021, Jun. 2, 2021, 51 pages.

*Voltserver Inc.*, v. *Cisco Systems, Inc.*, "Decision Denying Institution of Post-Grant Review," United States Patent and Trademark Office, PGR2021-00055, U.S. Pat. No. 10,735,105 B2, Aug. 19, 2021, 25 pages.

*Voltserver Inc.*, v. *Cisco Systems, Inc.*, "Decision Denying Institution of Post-Grant Review," United States Patent and Trademark Office, PGR2021-00056, U.S. Pat. No. 10,735,105 B2, Aug. 23, 2021, 18 pages.

*Voltserver Inc.*, v. *Cisco Systems, Inc.*, "Declaration of David A. Durfee, Ph.D.," United States Patent and Trademark Office, PGR2021-00055, U.S. Pat. No. 10,735,105, Feb. 16, 2021, 340 pages.

*Voltserver Inc.*, v. *Cisco Systems, Inc.*, "Declaration of Stephens S. Eaves," United States Patent and Trademark Office, PGR2021-00056, U.S. Pat. No. 10,735,105, Feb. 16, 2021, 7 pages.

Yencheck M.R., et al., "Thermal Modeling of Portable Power Cables," RI9463, 1993, 24 pages.

Zhang K., et al., "Machine Learning-Based Temperature Prediction for Runtime Thermal Management across System Components," IEEE Transactions on Parallel and Distribute, Mar. 2016, 15 pages.

Extended Search Report in European Patent Application No. 23198081.4, mailed Dec. 19, 2023, 8 pages.

* cited by examiner

DELIVERY OF AC POWER WITH HIGHER POWER PoE (POWER OVER ETHERNET) SYSTEMS

CROSS-REFERENCE TO RELATED APPLICATIONS

The present application is a continuation of U.S. patent application Ser. No. 17/705,797, entitled DELIVERY OF AC POWER WITH HIGHER POWER PoE (POWER OVER ETHERNET) SYSTEMS, filed Mar. 28, 2022, which is a continuation of U.S. patent application Ser. No. 16/913,632, entitled DELIVERY OF AC POWER WITH HIGHER POWER PoE (POWER OVER ETHERNET) SYSTEMS, filed Jun. 26, 2020 (now U.S. Pat. No. 11,327,541), which is a continuation of U.S. patent application Ser. No. 16/040,745, entitled DELIVERY OF AC POWER WITH HIGHER POWER PoE (POWER OVER ETHERNET) SYSTEMS, filed Jul. 20, 2018 (now U.S. Pat. No. 10,732,688), which claims priority from U.S. Provisional Application No. 62/641,203, entitled DELIVERING AC POWER WITH HIGHER POWER PoE SYSTEMS, filed on Mar. 9, 2018. The contents of these applications are incorporated herein by reference in their entireties.

TECHNICAL FIELD

The present disclosure relates generally to delivering AC power, and more particularly, to use of higher power PoE systems to power devices with AC power.

BACKGROUND

Power over Ethernet (PoE) is a technology for providing electrical power over a wired telecommunications network from power sourcing equipment (PSE) to a powered device (PD) over a link section. The maximum power delivery capacity of conventional PoE is approximately 90 watts, but many classes of devices would benefit from higher power PoE.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
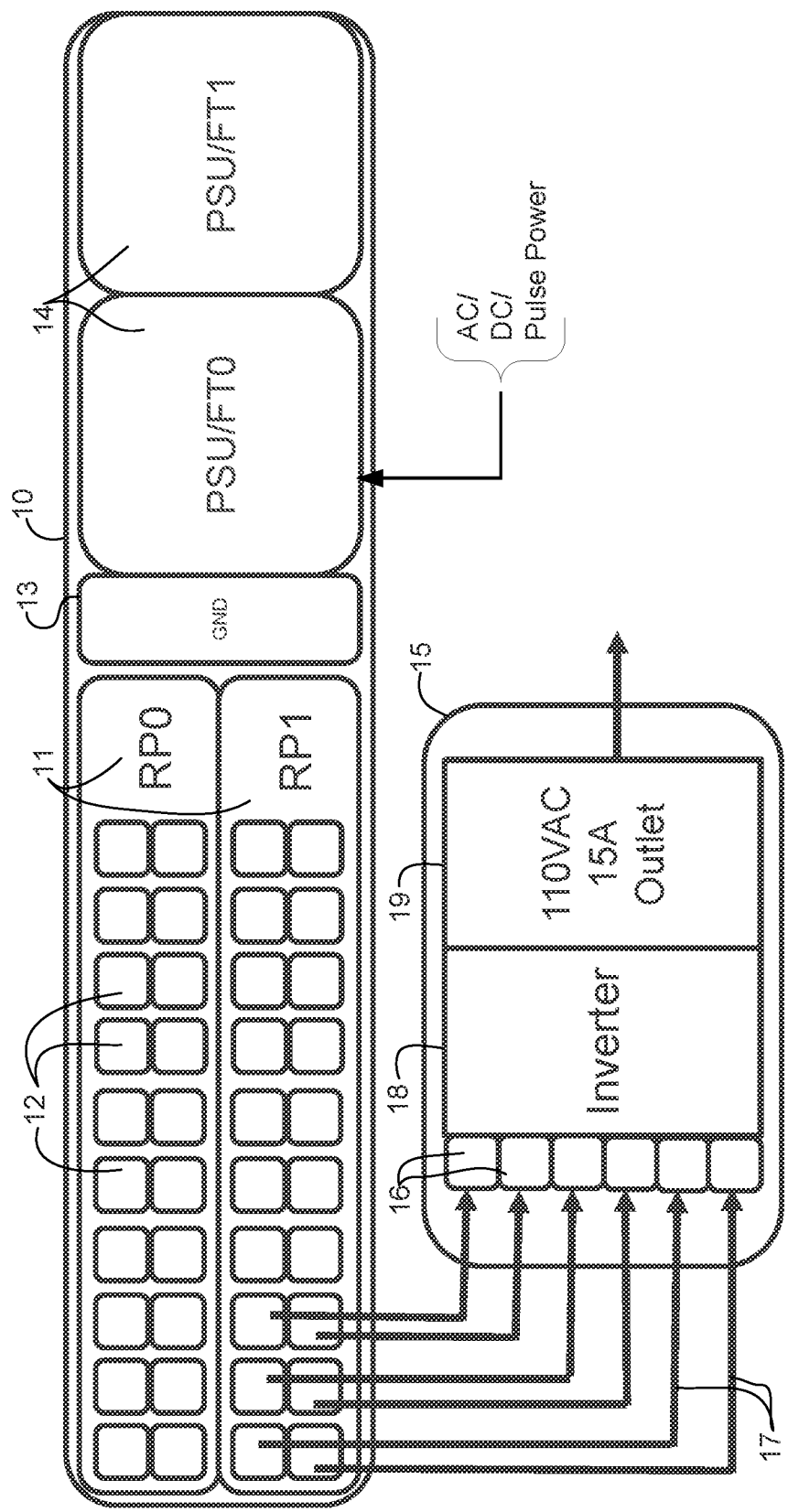
FIG. 1 illustrates a system for delivering higher power PoE to an AC power outlet through combined ports, in accordance with one embodiment.

In one embodiment, a method generally comprises grouping a plurality of ports at power sourcing equipment in a Power over Ethernet (PoE) system, the ports receiving power from at least one power supply, and transmitting power from the group of ports at the power sourcing equipment to a plurality of ports at a power interface module. The power transmitted at each of the ports is at least 100 watts and the power interface module is operable to combine the power received at the plurality of ports and provide an AC outlet.

In another embodiment, a system generally comprises a power supply, a plurality of ports for receiving power from the power supply, each of the ports configured to transmit at least 100 watts of power in a Power over Ethernet (PoE) system, and a power manager for managing power delivery from the ports. The system is operable to power one or more devices with AC power.

In yet another embodiment, a system generally comprises power sourcing equipment comprising a power supply and a plurality of ports each configured for transmitting Power over Ethernet (PoE) at a power of at least 100 watts, and a plurality of power interface modules, each of the power interface modules comprising a plurality of ports for communication with a group of the ports at the power sourcing equipment and an AC (alternating current) outlet delivering combined power received at the ports.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In order to create an all PoE (Power over Ethernet) port environment within a home, hotel, office space, or other residential or commercial location, there are several obstacles to overcome. These include availability of electrical outlets configured for 120 VAC (Volts Alternating Current)/20 A (amps) (or other standard AC power outlet) for the purpose of powering dishwashers, washing machines, refrigerators, hair dryers, vacuum cleaners, and other devices (appliances, equipment). These devices typically use higher than 90 W (watts) provided by conventional PoE systems.

In AC power environments in a home or business, there is typically a minimum number of AC outlets specified in the electrical code for each room. Conventional PoE systems (90 W or less), cannot sufficiently support these AC outlets and therefore cannot meet code requirements.

The embodiments described herein provide the delivery of power to meet AC power needs in commercial and residential environments in a higher power PoE system. In one or more embodiments, a shared circuit delivery system manages real time power to minimize the total required input power to the PoE system.

Referring now to the drawings, and first to FIG. 1, an example of a modular system that may be used to deliver power over communications cabling (also referred to herein as higher power or enhanced PoE) for power distribution at higher power levels (e.g., ≥100 watts) is shown. The modular system shown in the example of FIG. 1 includes a dual route processor (RP) card chassis 10 supplying control and power over PoE cables 17 to a power interface module 15 operable to combine power received from multiple ports 12 at a route processor 11 and convert PoE DC (direct current) power to AC (alternating current) power and create an AC power outlet.

It is to be understood that the term AC power outlet as used herein refers to any AC power outlet including standard outlets (e.g., 120 VAC outlet (e.g., 110-125 volts), 110 VAC, 220 VAC, 240 VAC, three-phase 208 VAC) or any other AC outlet for use in a residential or commercial environment.

The term higher power as used herein refers to power exceeding 90 watts (e.g., ≥100 W, 150 W, 300 W, 450 W) and the term lower power as used herein refers to power ≤90 watts.

In the example shown in FIG. 1, the route processor card chassis 10 is a two RU (rack unit) chassis comprising two route processors 11 (RP0, RP1) each comprising twenty downlink ports 12, a dual port ground system 13, and two combination power supply unit (PSU) and fan tray modules 14 (PSU/FT0, PSU/FT1). Each downlink port 12 may support, for example, a 300 W power system. In one example, the power supply provides dual 2 kW AC or DC redundant power modules (1+1). In this example, the RP card chassis 10 operates as the PSE (Power Sourcing Equipment) and the power interface module 15 or the device connected to the power interface module 15 is the PD (Powered Device) in the PoE distribution system. In one or more embodiments, the system may include an extended power system to supply four 2 kW redundant power modules (2+2) (e.g., double the delivered power capacity of the RP chassis 10 shown in FIG. 1).

In the example shown in FIG. 1, the power interface module 15 includes six ports 16 receiving power from a group of six 300 W ports 12 at the PSE 10 to provide an 1800 W circuit. The power interface module 15 comprises an inverter 18 for converting (changing) received DC power to AC power to create an AC power outlet 19 (e.g., outlet providing 110 VAC/15 A (amp (ampere)) power as shown in FIG. 1). In one example, the module 15 combines power received at the six ports 16 and changes 54 VDC power to 110 VAC power. In this example, the power inverter 18 may scale from 400 W to 1800 W based on port power availability and power allocation for those ports.

The cables 17 are configured to transmit both power and data from the PSE 10 to the power interface module 15. The cables 17 may be formed from any material suitable to carry both power and data. The cables 17 may comprise, for example Catx cable (e.g., category 5 twisted pair (e.g., four-pair) Ethernet cabling) or any other type of cable. The cables 17 may be arranged in any configuration. The cable 17 may be rated for one or more power levels, a maximum power level, a maximum temperature, or identified according to one or more categories indicating acceptable power level usage, for example. In one example, the cables 17 correspond to a standardized wire gauge system such as AWG (American Wire Gauge).

In one embodiment, the ports 12, 16 comprise interconnect ports that combine data and PoE utilizing an RJ45 (or similar connector) connected to cable 17. For example, the cable and connector system may comprise RJ45 cat7 style, four-pair communications cabling. The ports (jacks) 12, 16 may be labeled to identify capability for power exceeding 90 W. In one example, the cable and connector system may support ampacity per pin or wire to 2000 ma minimum. For example, 22 AWG wire may be used to support 1500 ma-2000 ma per wire in a cat7/cat5e cable system. In one example, the system may support a cable length of up to 15 meters (based on technology of cat7 cable, 22 AWG at 300 W). In one or more embodiments, the internal PSE power supply voltage may operate in the 56V to 57V range, 57V to 58V range, or 56V to 58V range. For example, the output voltage at the PSE may be 57V with an input voltage at the power interface module 15 of 56V. For a 15 meter cable, a 56V power supply at the PSE can deliver approximately 300 W power. Other cable lengths, cable types, and power settings may also be used.

The system may include, for example, safety and fault detection systems as described in U.S. patent application Ser. Nos. 16/020,881 and 16/020,917, filed Jun. 27, 2018, which are incorporated herein by reference in their entirety. For PoE applications exceeding 100 W, safety systems may include, for example, a fault detection system to detect shorts, opens, electrical imbalance, exceeding ampacity limits, or life safety concerns. In one or more embodiments, the power may be applied at a low power setting (e.g., ≤90 W) and increased to higher power after safe operating conditions have been verified. The system may, for example, cycle through and check each wire at the port or look for an electrical imbalance between wires or pairs of wires. The safety system may also identify that the correct cable/connector assembly is used for delivered power on the PoE port and provide for reduced load cable removal to allow for safe removal of the cable and plug from a powered jack.

The PSE (e.g., route processor chassis 10, route processor 11, or any routing device (e.g., network device (router, switch) operable to route, switch, or forward data) may be in communication with any number of power interface modules 15 via cables 17, as described below with respect to FIG. 3. The PSE may be configured to deliver power at one or more output levels (e.g., programmable PoE) and is provided power by at least one power supply unit 14. The PSE 10 may receive power from a DC power, AC power, or pulse power (PP) source. For example, as shown in FIG. 1, each PSU 14 may receive DC power, AC power, or pulse power.

In one or more embodiments, the PSE 10 may receive high power PoE (e.g., ≥1000 watts) as described in U.S. patent application Ser. No. 15/707,976 ("Power Delivery Through an Optical System", filed Sep. 18, 2017) or U.S. patent application Ser. No. 15/910,203 ("Combined Power, Data, and Cooling Delivery in a Communications Network"), filed Mar. 2, 2018, which are incorporated herein by reference in their entirety.

It is to be understood that the PoE system shown in FIG. 1 is only an example, and other arrangements (e.g., number of route processors 11, PSUs 14, power interface modules 15, ports 12, 16, or port groupings) may be used without departing from the scope of the embodiments. Furthermore, the connectors (jacks, plugs), cables, cable lengths, and power ranges described herein are only examples and other types of connectors, lengths of cable, type of cable systems, safety systems, or power levels may be used without departing from the scope of the embodiments.

Figure 2:
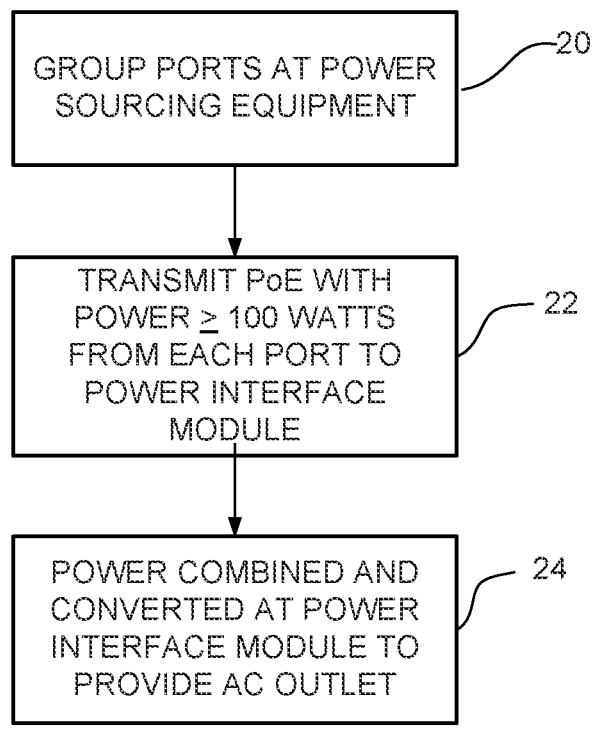
FIG. 2 is a flowchart illustrating an overview of a process for combining power from PoE ports at power sourcing equipment to create an AC power outlet, in accordance with one embodiment.

FIG. 2 is a flowchart illustrating an overview of a process for combining higher power PoE to provide one or more AC outlets, in accordance with one embodiment. At step 20, a plurality of ports 12 are grouped at power sourcing equipment 10 (FIGS. 1 and 2). As described above, each port 12 provides higher power PoE (e.g., ≥100 W, 300 W, 450 W). The PSE 10 transmits the higher power PoE from each port 12 in the group to the power interface module 15 (step 22). The power received at the ports of the power interface module is combined and converted to provide an AC outlet (e.g., 120 VAC outlet) (step 24).

It is to be understood that the process shown in FIG. 2 and described above is only an example and that steps may be modified or added, without departing from the scope of the embodiments.

Figure 3:
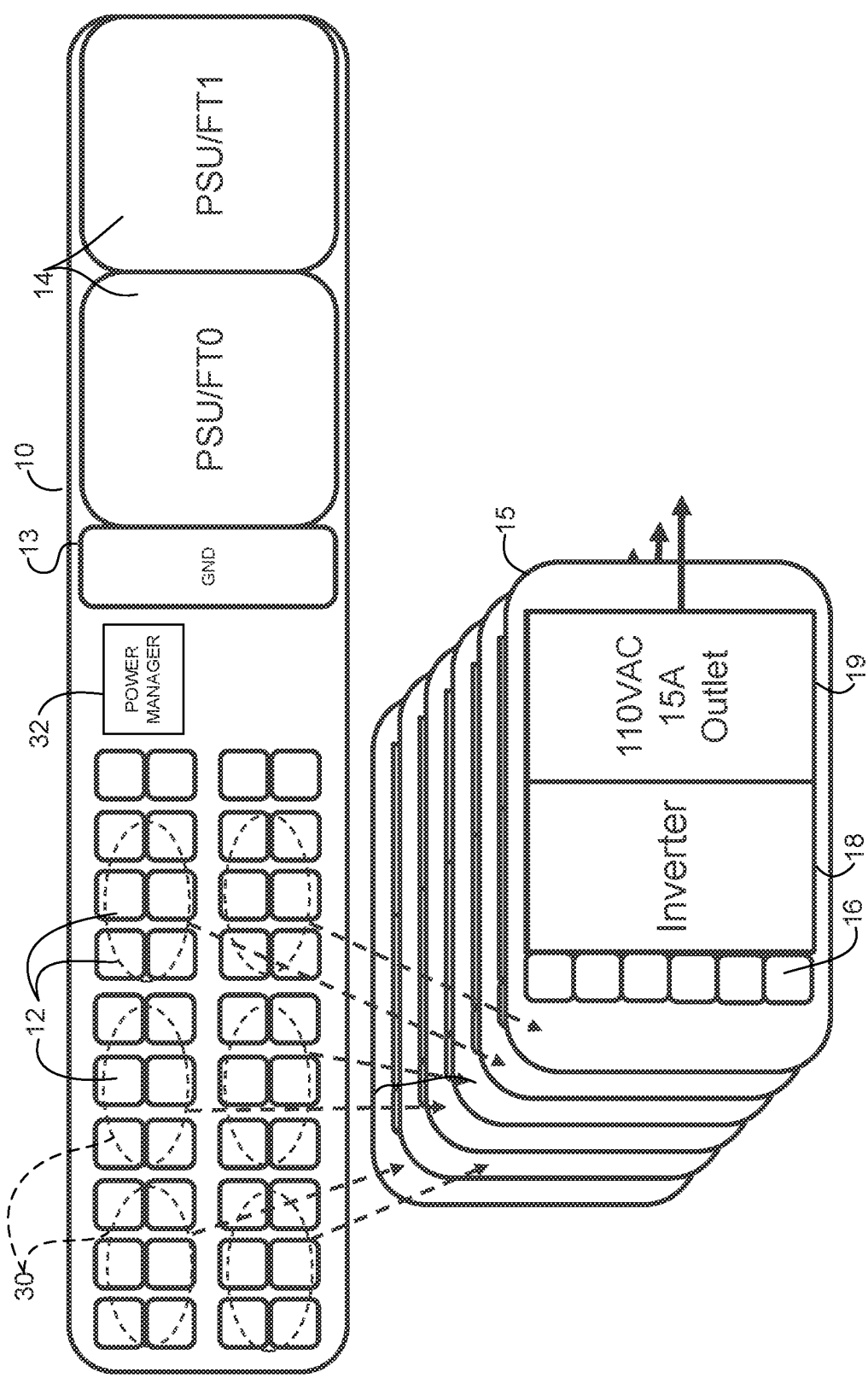
FIG. 3 illustrates grouping of ports at power sourcing equipment to power multiple AC power outlets, in accordance with one embodiment.

FIG. 3 illustrates an example in which port management is used to link two or more groups of ports to share an allotment of power. As previously described with respect to FIG. 1, an AC outlet 19 (e.g., 120 VAC outlet) may be created at some usable ampacity, such as 15 A or 20 A, by combining multiple ports 12 at the PSE 10. In the case of 300 W ports, six ports may be combined to deliver 110 VAC at 15 A. In the example shown in FIG. 3, ports 12 at the PSE are grouped into six port groups 30, each group comprising six ports. Each port group 30 provides power to one power interface module 15 comprising six ports 16, the inverter 18, and the AC power outlet 19, as described above with respect to FIG. 1.

For residential or commercial applications, it is common practice to place up to eight 120 VAC power outlets on a 20 A circuit, or six to eight outlets on a 15 A circuit. The PoE power distribution described herein may be used to deliver all power to the AC power outlets through communications cables. In the example shown in FIG. 3, six groupings 30 of six 300 W ports 12 are used to create six AC outlets 19 that can handle 15 A on the same circuit. Since it is desirable to not allocate 1800 W to each of the six groupings of six ports, 1800 W may be allocated across the groupings. This allows communications wiring supporting PoE to be used for each outlet 19, with the power allocated across each outlet, thereby mirroring a typical AC power outlet installation of six outlets attached to a single 15 A circuit breaker.

In one or more embodiments, management software (power manager 32) supports an electronic circuit breaker that manages the total 1800 W for the six groupings 30 such that when all six groupings exceed the 1800 W maximum current allocation, all ports are powered down until a reset is initiated. This allows the entire circuit to perform in a similar manner as to how six conventional power outlets on a 15 A circuit would perform. In one or more embodiments, the power management system prioritizes which grouping of ports in the set of groups can allocate from one allotment zone of multiple allotment zones, as described below with respect to FIG. 4.

For simplification, the PSE 10 of FIG. 1 is not shown in FIGS. 4, 6, 8A, 8B, 9A, and 9B. The power interface modules shown in those Figures may receive higher power PoE from a PSE as described above with respect to FIGS. 1 and 3, for example.

Figure 4:
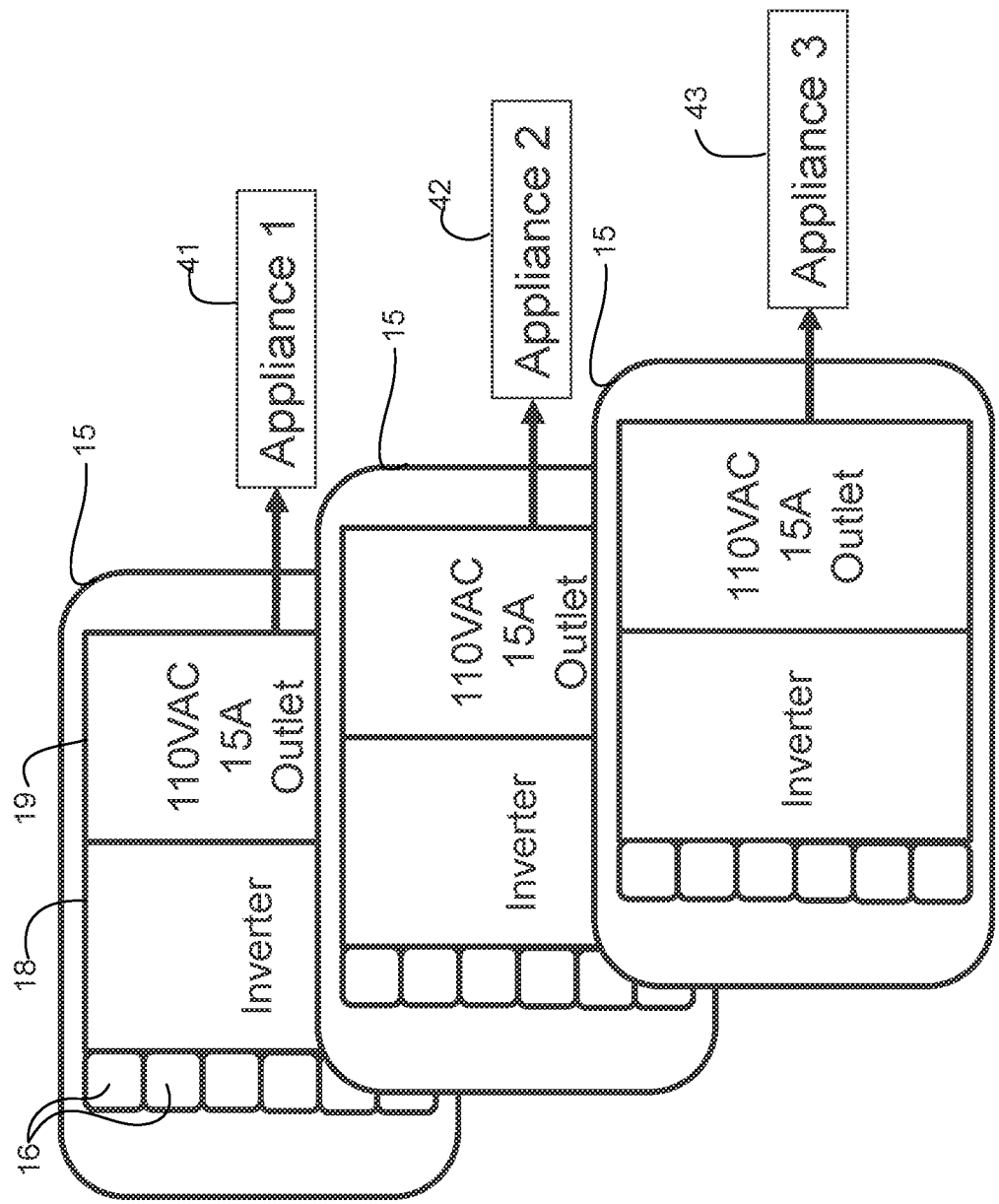
FIG. 4 illustrates sharing of power transmitted to the AC power outlets of FIG. 3.

FIG. 4 illustrates three of the power interface modules 15 shown in FIG. 3 with each interface module in communication with a different appliance (device) 41, 42, 43 (Appliance 1, Appliance 2, Appliance 3). The appliance may comprise, for example, a refrigerator, garbage disposal, dishwasher, washing machine, hair dryer, vacuum, garage door opener, sprinkler system, water heater, or any other electronic device, appliance, or equipment. The outlets 19 may share, for example, the same 1800 W power allocation and the power management system 32 is operable to disable one or more of the appliances to allow other appliances to operate over a short duration (FIGS. 3 and 4). The power may also be allocated to different outlets in the same group block.

In one example, the six port groupings 30 with six ports 12 per group are managed to mimic six outlets as a 15 A circuit with management software prioritizing group power allocation based on priority use of a particular residential or commercial application. For example, one port group 30 assigned to appliance 41 (via power interface module 15) may have power suspended for a time period acceptable to power down the appliance 41 so that this power can be re-allocated to other groupings of ports assigned to the same 15 A allocated circuit and power one or more other appliances 42, 43. The power manager 32 may disable the appliance by shutting off power at the corresponding PSE ports 12 or by sending a message to the power interface module 15.

In another example, a dishwasher (Appliance 1), refrigerator (Appliance 2), and garbage disposal (Appliance 3) may all use the same 15 A circuit (FIG. 4). When the dishwasher is energized, the refrigerator can be disabled for a period of time (e.g., five minutes), and then the dishwasher can be disabled for a period of time, with the refrigerator turned back on during that period to continue operating to reach the appropriate required cold temperature. The cycle may then repeat as needed. In another example, energizing the garbage disposal may temporarily disable other units on the line. With this level of power management on a 15 A 110 VAC circuit, power may be effectively allocated across various devices without allocating separate 15 A circuits. The embodiments thus allow the entire system to operate more efficiently, at a lower cost, and with more flexibility.

It is to be understood that the arrangement shown in FIG. 4 is only an example and that any number of power interface modules 15 may be in communication with any number of devices to share a power allotment from the PSE.

Figure 5A:
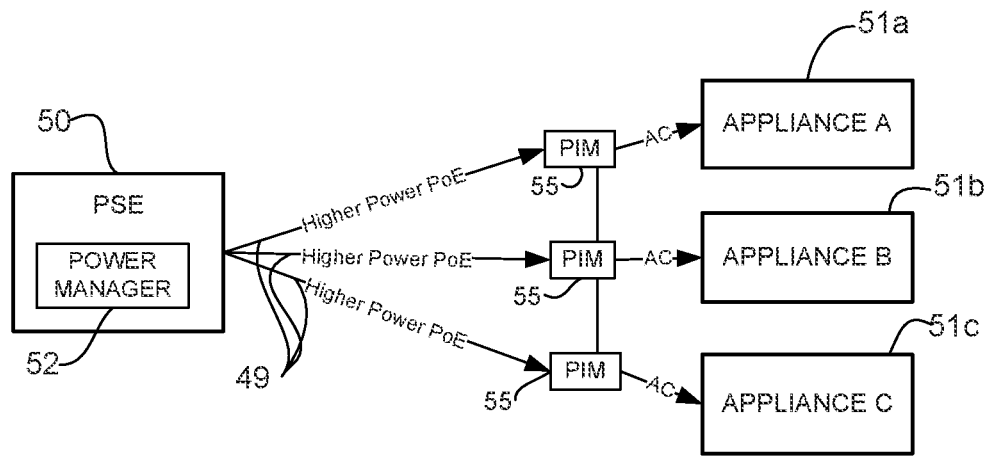
FIG. 5A is a block diagram illustrating a power manager at power sourcing equipment in a higher power PoE system, in accordance with one embodiment.

FIG. 5A is a block diagram illustrating a power manager 52 at a PSE 50 in communication with three appliances 51a, 51b, 51c (Appliance A, Appliance B, Appliance C) through power interface modules (PIMs) 55. PSE 50 provides higher power PoE to the power interface modules 55 over cables 49. The cables 49 may also transmit control signaling and status information between the power manager 52 and power interface modules 55 or appliances 51a, 51b, 51c. The power interface module 55 delivers AC power to the appliance (e.g., for non-PoE applications) and may also transmit data (PoE) to or from a smart appliance. Connections between the PIMs 55 allow sharing of AC power between the PIMs to provide power sharing between the appliances 51a, 51b, 51c. The power manager 52 may store information (e.g., profile stored in database or programmed) for each appliance identifying appropriate power cycles (e.g., how long an appliance may be powered down, power needed for operation, time for operation, etc.) for use in selecting appliances to power down and how long to power down. In one or more embodiments, the power manager 52 makes decisions as to which appliance to power down or how long to power down the appliance based on available power and power requirements of the appliances, without receiving input from the appliances (e.g., power manager does not negotiate power allocation with power interface module or appliances).

Figure 5B:
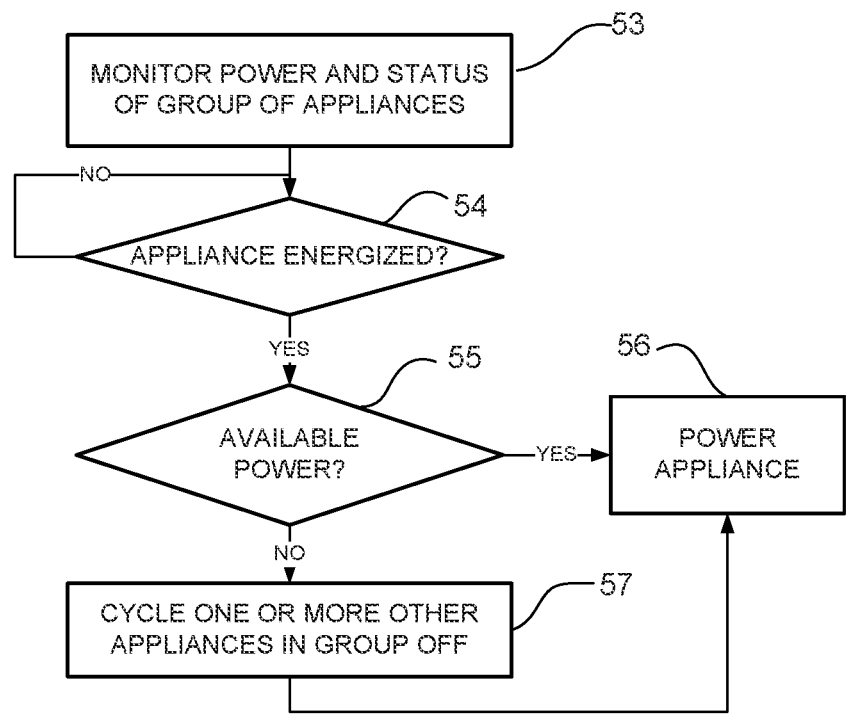
FIG. 5B is a flowchart illustrating an overview of a process for sharing a power allotment from power sourcing equipment at a plurality of devices receiving power from AC power outlets, in accordance with one embodiment.

FIG. 5B is a flowchart illustrating an overview of a process for shared power allocation, in accordance with one embodiment. At step 53, a power management system (e.g., power manager 52 in FIG. 5A) monitors power and status of a group of devices (e.g., appliances 51a, 51b, 51c in FIG. 5A). Each appliance may be associated with a profile identifying its power needs. For example, a refrigerator may have a profile that specifies that it can be powered down for a limited time period (e.g., five minutes or any other suitable time period). If sufficient power is available, the appliance will be powered on as needed (steps 55 and 56). If there is not sufficient power available when an appliance is energized (e.g., garbage disposal activated), the power manager 52 identifies one or more other appliances (e.g., refrigerator) for which power can be temporarily reduced or turned off (steps 55 and 57). If an appliance runs for an extended period of time (e.g., dishwasher), the power manager may cycle other appliances on and off, as needed. Each appliance may have a default profile or the power manager may be programmed for specific equipment or user needs.

It is to be understood that the system shown in FIG. 5A and the process shown in FIG. 5B and described above are only examples and that the system may include additional components or the process may include additional or different steps without departing from the scope of the embodiments.

Figure 6:
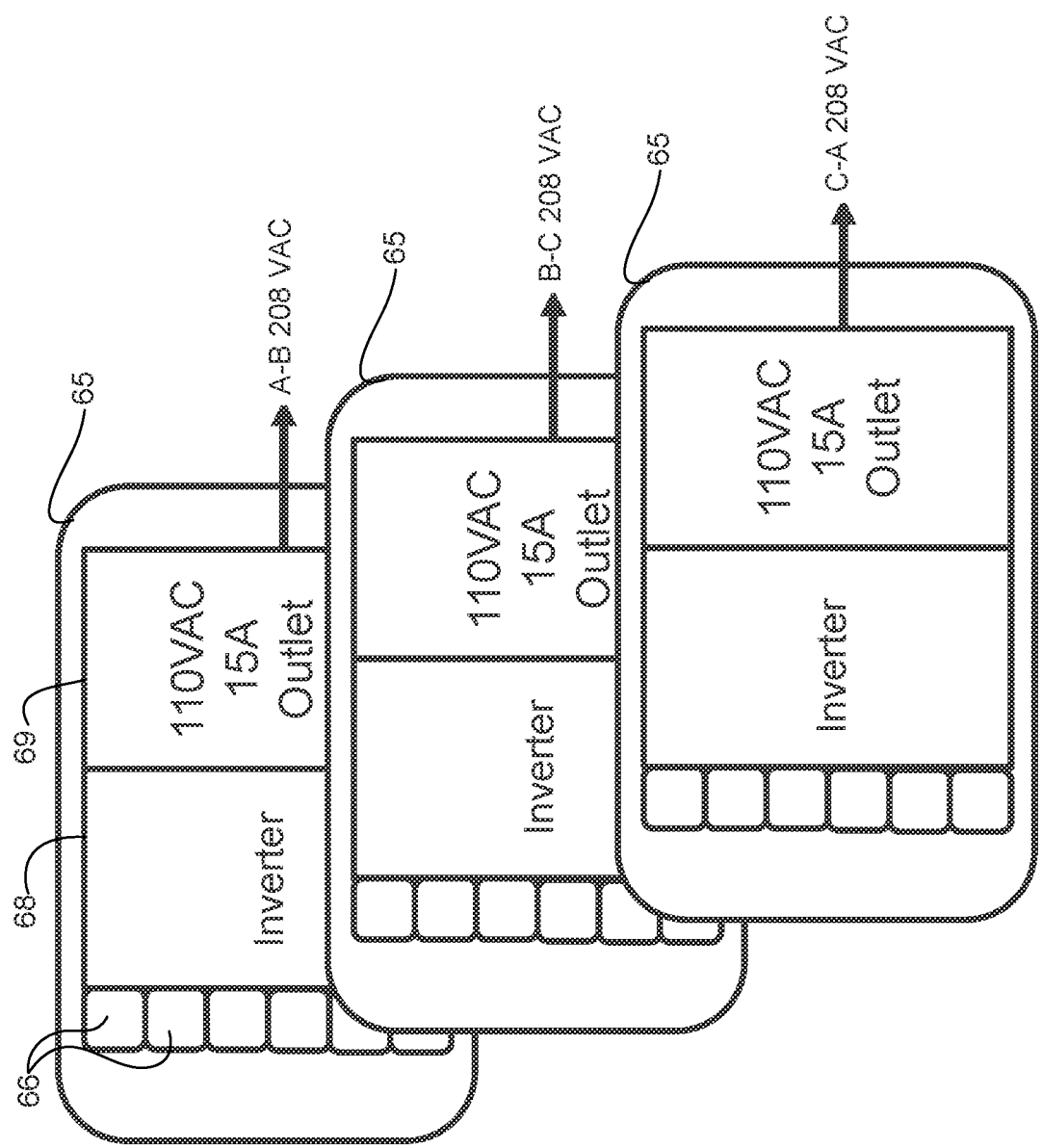
FIG. 6 illustrates combining higher power PoE to provide three-phase AC power outlets, in accordance with one embodiment.

FIG. 6 illustrates combining PoE power to provide one or more three-phase AC power outlets, in accordance with one embodiment. Three distinct but related groupings may be used to create the three-phase power. In the example shown in FIG. 6, each power interface module 65 comprises six ports 66 and an inverter 68 for creating a 208 VAC three-phase power outlet 69 (A-B 208 VAC, B-C 208 VAC, C-A 208 VC). In this example, powering of a 15 A circuit with six 300 W ports may be scaled such that three groupings of six ports 66 can deliver power to the inverter 68, with the inverter creating three separate phases with phase-to-phase voltage of 208 VAC. Each inverter circuit may be phased current in a standard delta or Y configuration. The three managed groups of six ports per group may effectively control phase-to-phase imbalance by lowering voltage slightly on a single phase, or adjusting current per phase as needed to maximize power factor.

The circuit shown in FIG. 6 may be used to power, for example, an L6 or L14 type AC outlet used in various applications in a residential or commercial environment. Communications cable may be used to deliver power to the three-phase load such that minimal electrical system build out is needed. This eliminates the need to build out AC electrical systems and allows communications cabling to deliver power to AC electrical system outlets based on growth or demand. In one or more embodiment, pulse power may be provided to the PSE and converted to AC power, as previously described.

Figure 7:
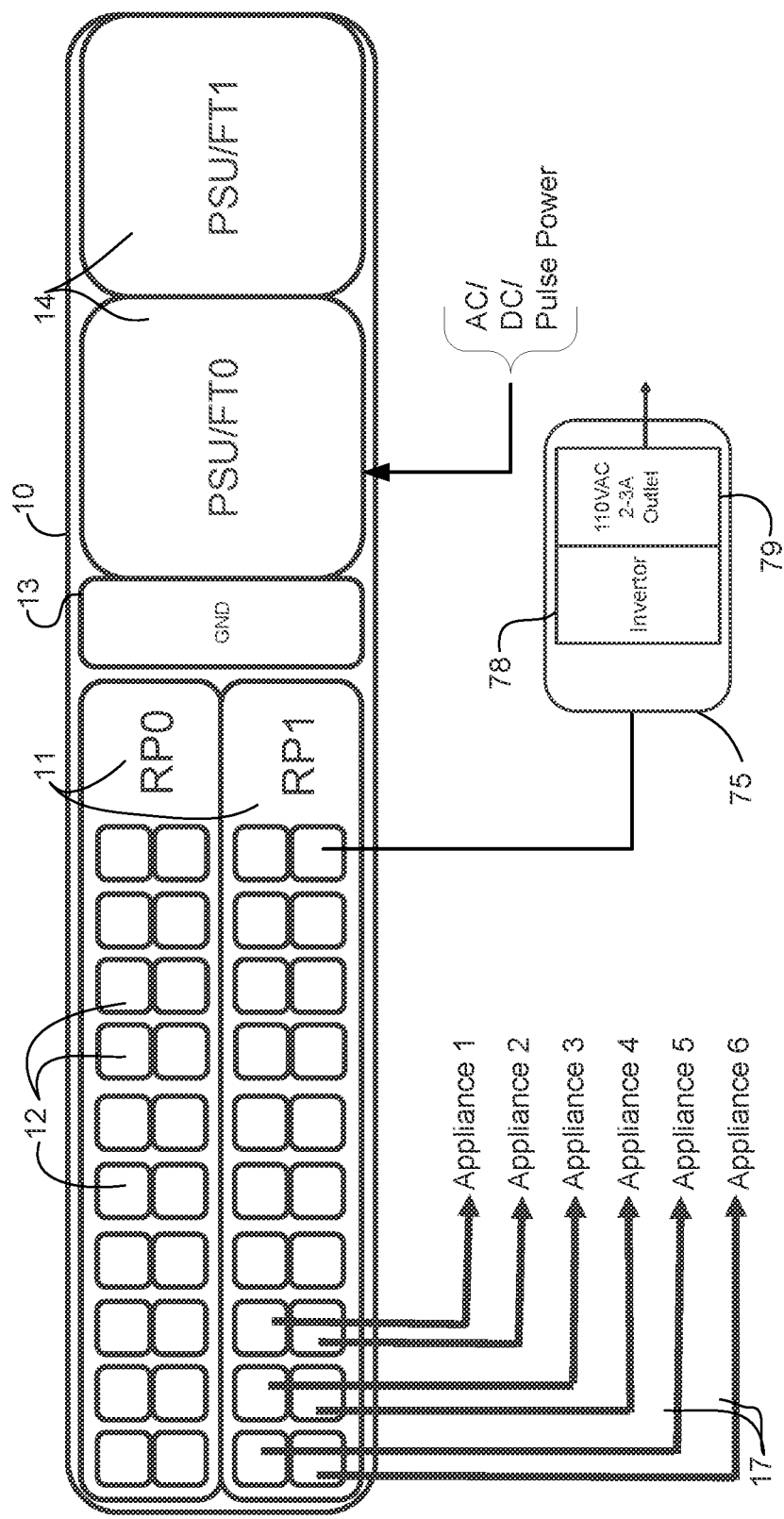
FIG. 7 illustrates delivery of PoE through telecommunications cabling directly to higher power devices, in accordance with one embodiment.

For applications that have low enough power needs (e.g., some vacuum cleaners, refrigerators, or garage door openers), it is possible to directly connect the PoE cable to those devices, as shown in FIG. 7. The devices may be connected via typical RJ45 Ethernet jacks, for example, and may benefit from Ethernet connectivity. The appliances (e.g., Appliance 1, Appliance 2, Appliance 3, Appliance 4, Appliance 5, Appliance 6 in FIG. 7) may include, for example, a vacuum, garage door, sprinkler system, water heater, or any other appliance, device, or equipment. In one example, the PSE 10 may provide 450 W power per port. If the PoE power source is battery backed, applications such as garage doors may still open or close when AC power is unavailable (e.g., power outage).

In one or more embodiments, a managed PoE port to a garage door opener (or other device or appliance) may be programmed or allow other avenues of control. In one example, when residents are away from home on a trip, the PoE power to the garage door opener may be limited until an Ethernet packet is sent to enable full power. This would prevent others from opening the garage door. In this example, the power is only restored via a managed command to the power manager.

As shown in FIG. 7, one or more of the ports 12 may deliver power to a PIM (power interface module) 75 comprising an inverter 78 and an AC outlet 79 (e.g., 110 VAC, 2-3 amp). The outlet 79 may be used, for example, to power a phone charger, laptop, or other device. As previously described, the PSUs 14 may receive AC power, DC power, or pulse power. In one example, one or more of the ports 12 may provide a direct flow through of power to one or more devices (e.g., Appliance 1-6 in FIG. 7), one or more ports may individually provide power to an AC outlet 79 (FIG. 7), and a group of ports 12 may provide power to an AC outlet 19 (FIG. 1). Thus, the ports 12 at the PSE 10 may be used for multiple applications, either individually or in groups. The PSE 10 may be used, for example, to provide power for devices or appliances in a residence, business, hotel room, or other environment.

FIGS. 8A, 8B, 9A, and 9B illustrate examples of reliable outlets that may be used to power emergency service equipment 82, 92 or life safety equipment (e.g., hospital equipment) 83, 93. Priority power may be allocated to life safety circuits, emergency systems, critical systems, and then general availability, in this order, for example. Power management software may be used to reorganize or prioritize in a different order.

Figure 8A:
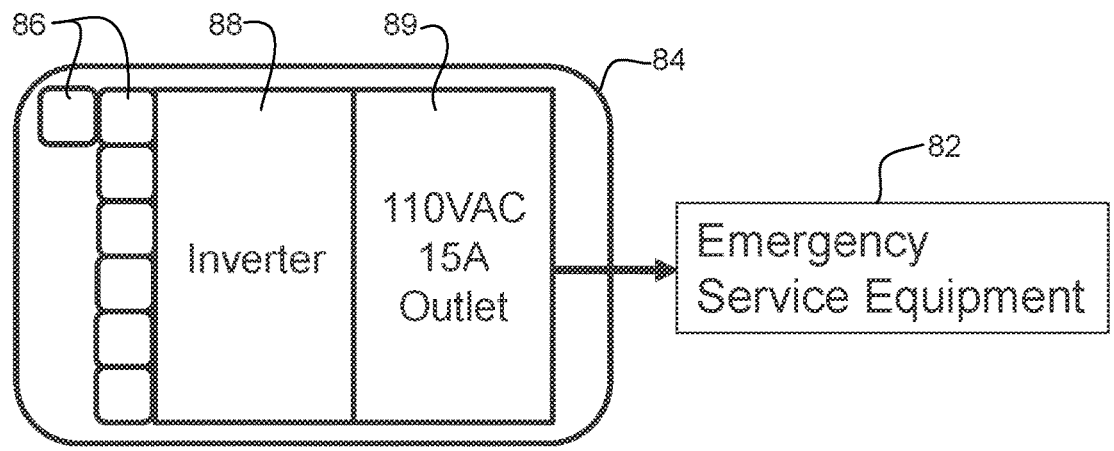
FIGS. 8A and 8B illustrate reliable outlets for emergency service and life safety equipment, in accordance with one embodiment.
Figure 8B:
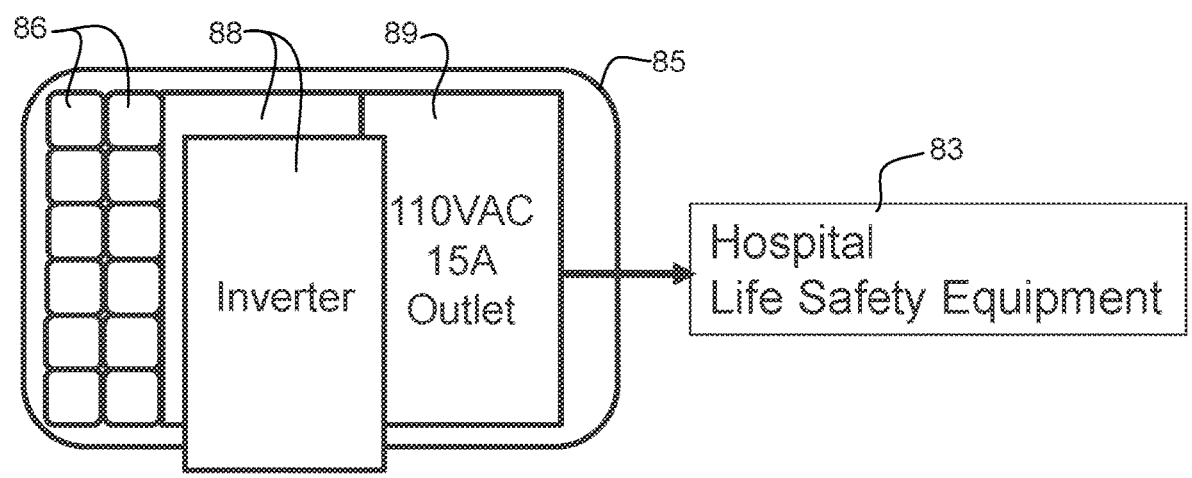
Figure 9A:
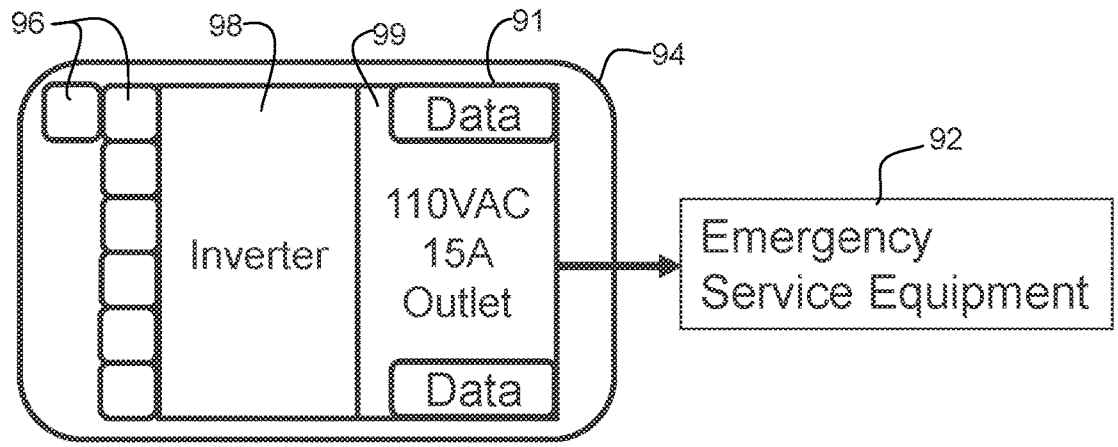
FIGS. 9A and 9B illustrate reliable outlets with data for emergency service and life safety equipment, in accordance with one embodiment.
Figure 9B:
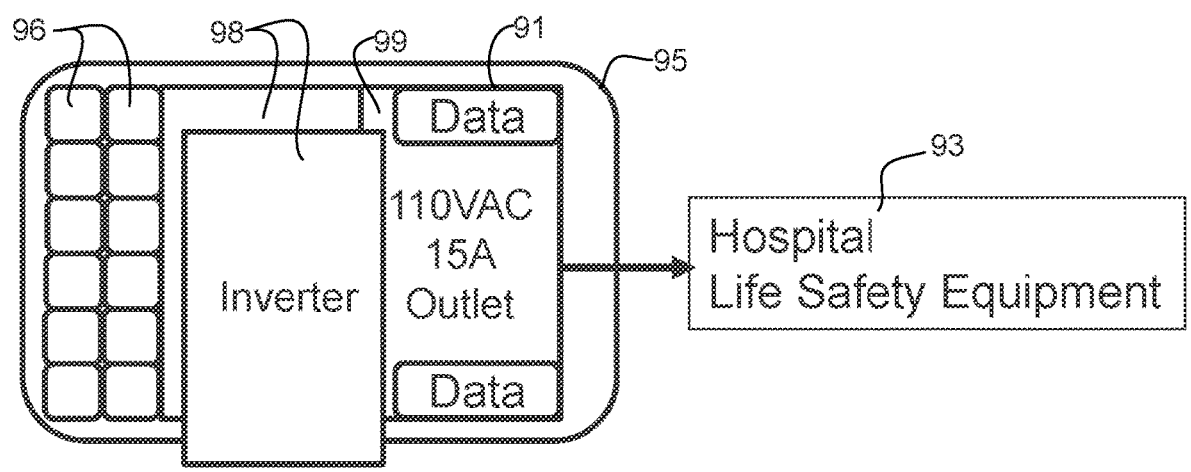

Each power interface module 84, 85, 94, 95 comprises ports 86, 96 and one or more inverters 88, 98. In one example, all outlets share the same 1800 W power allocation. An emergency services outlet 89, 99 is shown in a 6+1 cabling configuration. Powering of a 15 A circuit with six 300 W ports may be made more reliable by adding a single cable (6+1) (FIGS. 8A and 9A). In this configuration, the system now has increased reliability in the unlikely event of a conductor, cable, connector, or port power fault condition. A life safety outlet is shown in a 6+6 cabling configuration for improved backup and reliability (FIGS. 8B and 9B). Powering the same inverter circuit in a 6+6 configuration has the additional ability to provide redundant switch systems where some ports come from one switch system and some ports come from other switch systems powering the AC circuit. In this manner, at least two switch systems provide PoE power to the inverter circuit 88, 98. The system may include dual inverters 88, 98 as shown in FIGS. 8B and 9B, with one inverter powered by six ports 86, 96 and the second inverter powered by the other six ports.

In one example, six ports 86, 96 may receive power from one UPS (Uninterruptible Power Supply) driven switch and the other six ports may receive power from a second UPS driven switch. All twelve ports 86, 96 may be served from one UPS backed switch if cable reliability is the only concern. However, true redundancy with at least two switches may be preferred. In another example, four groups of three ports may receive power from four UPS backed switches.

As shown in FIGS. 9A and 9B the AC outlets 99 may also include data ports 91 with data connectivity provided by the PoE cables.

It is to be understood that the higher power PoE systems, network devices (switches, routers), appliances, power levels, current ranges, number of ports, size of port groupings, sharing of power, and power allocation described herein are only examples and that other systems, devices, appliances, arrangements, power levels, or power control/management may be used, without departing from the scope of the embodiments.

Figure 10:
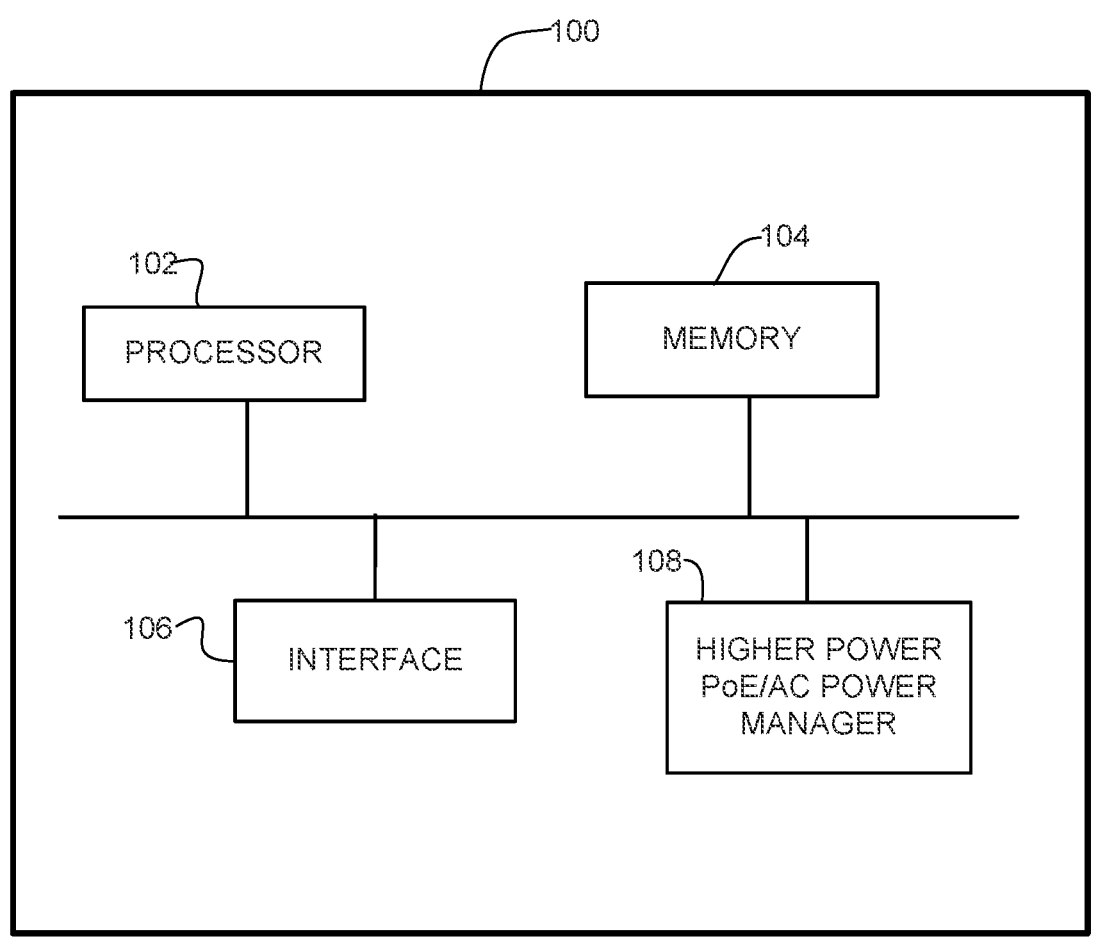
FIG. 10 depicts an example of a network device useful in implementing embodiments described herein.

FIG. 10 illustrates an example of a network device 100 (e.g., transport system, route processor card chassis in FIG. 1) that may be used to implement the embodiments described herein. In one embodiment, the network device 100 is a programmable machine that may be implemented in hardware, software, or any combination thereof. The network device 100 includes one or more processors 102, memory 104, interface 106, and higher power PoE/AC power manager module 108.

Memory 104 may be a volatile memory or non-volatile storage, which stores various applications, operating systems, modules, and data for execution and use by the processor 102. For example, components of the power manager module 108 (e.g., code, logic, or firmware, etc.) may be stored in the memory 104. The network device 100 may include any number of memory components.

The network device 100 may include any number of processors 102 (e.g., single or multi-processor computing device or system), which may communicate with a forwarding engine or packet forwarder operable to process a packet or packet header. The processor 102 may receive instructions from a software application or module, which causes the processor to perform functions of one or more embodiments described herein.

Logic may be encoded in one or more tangible media for execution by the processor 102. For example, the processor 102 may execute codes stored in a computer-readable medium such as memory 104. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. Logic may be used to perform one or more functions described above with respect to the flowcharts of FIGS. 2 and 5B or other functions described herein. The network device 100 may include any number of processors 102.

The interface 106 may comprise any number of interfaces or network interfaces (line cards, ports, connectors) for receiving data or power, or transmitting data or power to other devices. The network interface may be configured to transmit or receive data using a variety of different communications protocols and may include mechanical, electrical, and signaling circuitry for communicating data over physical links coupled to the network or wireless interfaces. For example, line cards may include port processors and port processor controllers. The interface 106 may be configured for PoE, enhanced PoE, higher power PoE, PoE+, UPoE, or similar operation.

It is to be understood that the network device 100 shown in FIG. 10 and described above is only an example and that different configurations of network devices may be used. For example, the network device 100 may further include any suitable combination of hardware, software, algorithms, processors, devices, components, or elements operable to facilitate the capabilities described herein.

The embodiments described herein may operate in the context of a data communications network including multiple network devices. The network may include any number of network devices in communication via any number of nodes (e.g., routers, switches, gateways, controllers, access points, or other network devices), which facilitate passage of data within the network. The network devices may communicate over or be in communication with one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet of Things (IoT), Internet, intranet, or any other network).

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
    grouping a plurality of ports into one or more groups of ports at power sourcing equipment that receives power such that each group of ports of the one or more groups of ports provides the power to a respective power interface module of a plurality of power interface modules, wherein grouping the plurality of ports is based on a power requirement of one or more devices; and
    transmitting the power from a respective group of ports to the respective power interface module operable to combine the power and provide an alternating current (AC) outlet configured to provide the power to the one or more devices.

2. The method of claim 1, further comprising:
    transmitting the power from another group of ports to another power interface module that provides a direct current (DC) outlet configured to provide the power to the one or more devices.

3. The method of claim 1, wherein grouping the plurality of ports is further based on an available power.

4. The method of claim 3, wherein grouping the plurality of ports includes:
    prioritizing the available power to a life safety equipment of the one or more devices.

5. The method of claim 1, wherein the plurality of ports transmit Power over Ethernet (POE).

6. The method of claim 1, wherein each of the plurality of ports transmits at least 100 watts of the power.

7. The method of claim 1, wherein the one or more groups of ports include a plurality of port groups at the power sourcing equipment, each of the plurality of port groups transmitting the power to a different power interface module of the plurality of power interface modules.

8. The method of claim 1, wherein the power sourcing equipment receives the power as one of a direct current (DC), a pulsed power, or a voltage.

9. The method of claim 1, wherein the one or more devices include a first device and a second device, wherein the first device is directly connected to the power sourcing equipment and the second device is connected to the power sourcing equipment via the respective power interface module.

10. A method comprising:
receiving a direct current (DC) power or a pulsed power at a network device;
converting, at the network device, the DC power or the pulsed power to Power over Ethernet (POE); and
transmitting the PoE to a power interface module, wherein the power interface module is configured to convert the PoE to another power type and to provide the another power type at an outlet to power one or more devices, wherein the another power type is one of an alternating current (AC) power or the DC power.

11. The method of claim 10, wherein the power interface module provides a DC outlet configured to provide the another power to the one or more devices.

12. The method of claim 10, wherein the power interface module is configured to combine the PoE received at a plurality of ports.

13. The method of claim 12, wherein each of the plurality of ports transmits at least 100 watts of the PoE.

14. A system comprising:
a network device configured to receive a direct current (DC) power or a pulsed power;
a plurality of ports at the network device, each of the plurality of ports is configured to transmit Power over Ethernet (POE); and
a power interface module configured to receive the PoE from at least one of the plurality of ports and to convert the PoE to another power to provide an alternating current (AC) outlet that supplies the another power to one or more devices.

15. The system of claim 14, wherein the network device comprises a chassis card.

16. The system of claim 14, wherein the power interface module is a first power interface module and further comprising:
a second power interface module that provides a DC outlet configured to provide the another power to the one or more devices.

17. The system of claim 14, wherein the power interface module includes a plurality of power interface modules and further comprising:
a power manager configured to reduce the PoE at one or more of the plurality of power interface modules based on a required power at the one or more devices exceeding an available power.

18. The system of claim 17, wherein the power manager is configured to monitor the another power by using a power profile identifying a power cycle for each of the one or more devices and is configured to select the one or more of the plurality of power interface modules for reducing the another power based on the power profile.

19. The system of claim 14, wherein the power interface module is configured to provide the another power based on a power requirement of at least two devices that varies over time.

20. The system of claim 14, wherein the one or more devices include at least two devices, and wherein the power interface module is configured to provide the power based on a power profile identifying a power cycle for each of the at least two devices that includes a time interval for which a respective device is to be powered down or reduced in the power being provided, an amount of the power for operation of the respective device, and an operational duration for the respective device, and the power interface module is configured to balance the power among the at least two devices based on the power profile.

* * * * *